United States Patent [19]

Grant

[11] 4,242,574
[45] Dec. 30, 1980

[54] DIGITAL DISPLAY TAPE MEASURE WITH PHOTOELECTRIC SENSING OF TAPE DISPLACEMENT

[76] Inventor: Walter W. Grant, Box 245, Pierson Dr. R.D. 1, Shelburne, Vt. 05482

[21] Appl. No.: 874,473

[22] Filed: Feb. 2, 1978

[51] Int. Cl.³ .......................... G06M 3/14; G01B 3/12
[52] U.S. Cl. .............................. 235/92 DN; 33/140; 235/92 V; 235/92 EV
[58] Field of Search ....... 235/92 DN, 92 MP, 92 EV, 235/92 V, 92 CV; 33/137 R, 139, 140; 250/570, 571, 560, 234

[56] References Cited

U.S. PATENT DOCUMENTS

| | | | |
|---|---|---|---|
| 3,692,985 | 9/1972 | Kalman | 235/92 V |
| 3,764,781 | 10/1973 | Kreithen et al. | 235/92 MP |
| 3,780,440 | 12/1973 | Taylor | 33/139 |
| 3,793,508 | 2/1974 | Maggi | 235/92 V |
| 3,812,589 | 5/1974 | Schultheis | 33/139 |
| 3,858,033 | 12/1974 | Esch | 235/92 DN |
| 3,872,288 | 3/1975 | Sampey | 235/92 DN |
| 3,902,063 | 8/1975 | Oelsch et al. | 250/234 |
| 3,916,174 | 10/1975 | Moule | 235/92 DM |
| 3,965,340 | 6/1976 | Renner | 235/92 DM |
| 3,982,107 | 9/1976 | Butler | 235/92 DN |
| 4,013,944 | 3/1977 | Benya et al. | 33/126.6 |
| 4,031,360 | 6/1977 | Soule | 235/92 DN |
| 4,150,282 | 4/1979 | Aoki et al. | 235/92 DN |
| 4,161,781 | 7/1979 | Hildebrandt et al. | 235/92 DN |

*Primary Examiner*—Joseph M. Thesz
*Attorney, Agent, or Firm*—Parmelee, Johnson, Bollinger & Bramblett

[57] ABSTRACT

A flexible tape is releasably wound into a coil within a housing. Optically sensed encoded markings along the length of the tape are illuminated by a light source through fiber optic bundles. The light reflected from the illuminated markings is transmitted by additional fiber optic bundles to two light detectors for sensing the markings as the tape is wound or unwound from the coil. The markings are counted as they pass the fiber optic bundles by electronic logic circuitry the output of which controls a digital display on the housing.

Two sets of markings are provided along the tape so that the display may be switched between metric and feet and inch units without making substantial changes in the electronic logic circuitry. The electronic count may be reset to zero at any extension of the tape and subsequent readings would then be plus or minus from that extension.

10 Claims, 7 Drawing Figures

DIGITAL DISPLAY TAPE MEASURE WITH PHOTOELECTRIC SENSING OF TAPE DISPLACEMENT

BACKGROUND OF THE INVENTION

This invention relates to tape measures and more particularly to hand-held type measures having digital readouts.

Attempts have been made to adapt the digital readout technology to conventional tape measures. An example of such a tape measure is found in U.S. Pat. No. 4,031,360 to Soule. Although the patent provides an electronic readout, it lacks a simple, lightweight tape-displacement transducer element necessary for an acceptable hand-held tape measure. There is no disclosure nor suggestion in the Soule patent of providing a digital readout which can be switched between metric and feet and inch (English) units. Further, if an attempt were made in the Soule tape measure to provide for readout in both metric and English units, it appears that a multitude of complexities would arise; whereas a tape measure embodying the present invention achieves such a dual unit output capability in a compact, efficient structure.

An object of this invention is to provide an exceptionally lightweight and compact hand-held tape measure having a digital readout.

A further object of the invention is to provide an inexpensive yet highly accurate tape displacement transducer which provides for readout in either metric or English units without further complication of the logic circuitry.

SUMMARY

According to the invention in one of its aspects, a flexible tape is wound into a coil in a housing. Optically sensed encoded markings along the length of the tape are illuminated by a light source in the housing, and a light detector adjacent the tape detects the illuminated markings as they pass the light detector during winding or unwinding of the tape. Electronic logic means in the housing provide an electronic count proportional to the longitudinal displacement of the tape past the light detector and control a digital display in response to the electronic count.

According to another aspect of the invention, forward and reverse movement of the tape is sensed by two light detectors which receive light from the markings through two fiber optic bundles.

According to the invention in yet another of its aspects, the light is transmitted to the tape through an additional fiber optic bundle. The fiber optic scanning apparatus may be laterally shifted across the tape in position to detect either of two sets of markings for thus providing a digital output in either of two separate respective units of measure (metric or English) without changing the circuitry.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
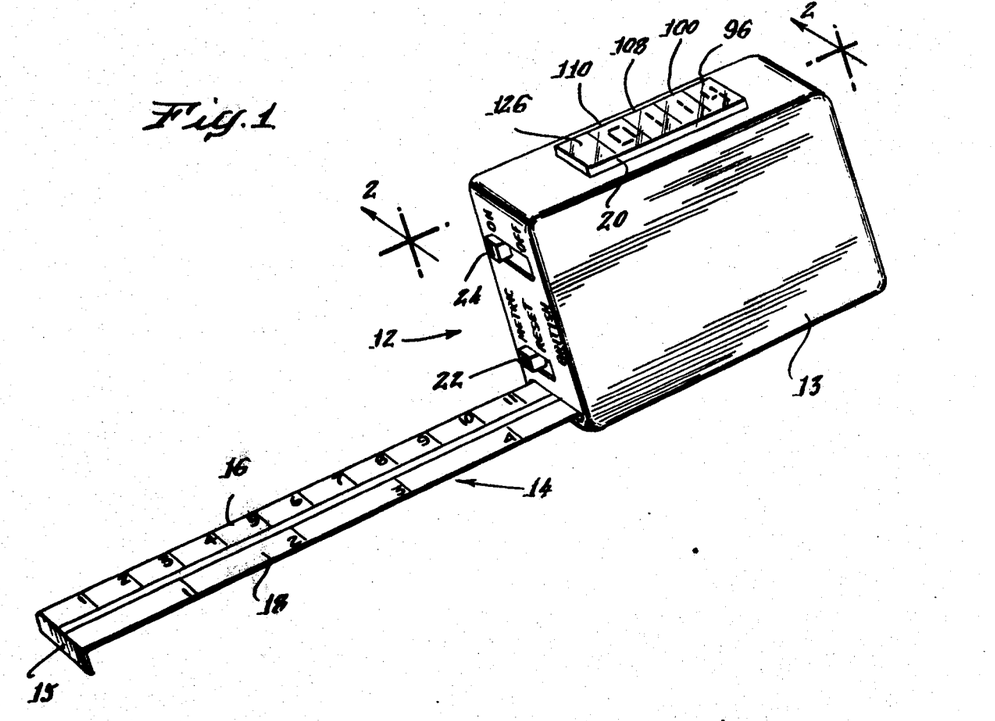
FIG. 1 is a perspective view of a tape measure embodying the invention and having a digital readout, with the tape being shown partially extended.

A tape measure having the general appearance of a conventional tape measure but with a digital display is shown in FIG. 1. A flexible steel tape 14 having a catch finger 15 at the end thereof is shown partially extended. The tape has a metric scale 16 and English scale 18 thereon for conventional measuring in the event that the user wishes to use it in the conventional way. A digital display 20, which may for example include light emitting diodes or liquid crystals, is mounted in the top of the housing 13. An on/off switch 24 and unit-select/reset switch 22 are positioned on the end face of the housing 13.

Figure 2:
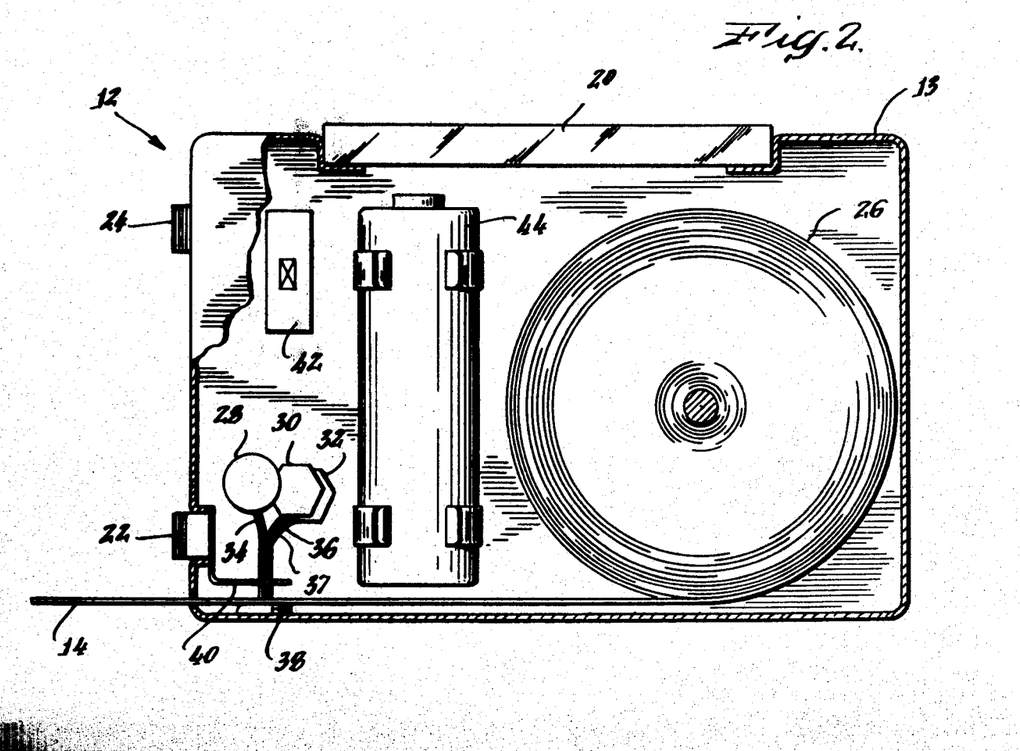
FIG. 2 is a sectional elevation of the tape measure of FIG. 1 taken along lines 2—2, showing the various components in elevation.
Figure 5:
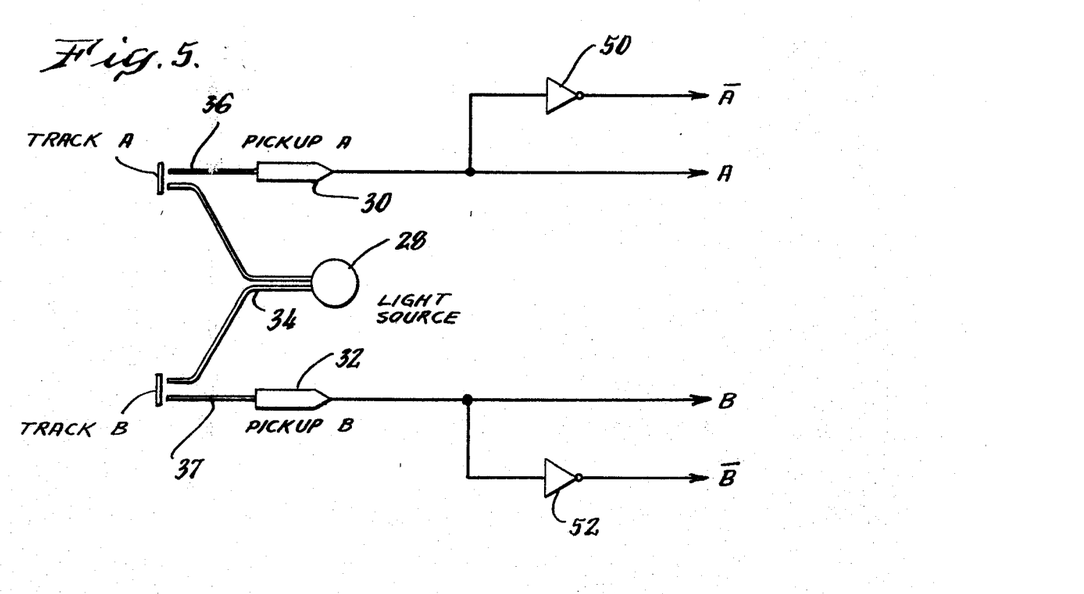
FIG. 5 is a schematic circuit diagram of the photoelectric transducer and scanner apparatus.

The general layout of the interior of the tape measure device is shown in FIG. 2. The tape 14 is wound in a coil 26 by a suitable spring mechanism, not shown, which may be the same as in conventional tape measures. The tape displacement transducer is a photoelectric transducer including a light emitting diode (LED) 28 as a light source and two photodetectors 30 and 32. Light is transmitted from the LED 28 to the tape through a fiber optic bundle 34, which is split into two branches, as shown in FIG. 5, for simultaneously illuminating two tracks A and B. The light reflected from these tracks on the tape is transmitted to the photodetectors through respective fiber optic bundles 36 and 37. A tape support 38 (FIG. 2) retains the flexible tape 14 near the ends of the fiber optic bundles in close optical scanning relationship therewith.

In order to provide for readout in either metric or English units, the lower ends of the fiber optic bundles are shifted transversely across the tape 14 into either of two alternate scanning positions by a fiber optic locating arm 40 fixed to the selector/reset switch 22.

Logic circuitry for deriving a count to be displayed by the digital display panel 20 is incorporated into an integrated circuit 42. The electrical power supply is a compact battery 44.

Figure 3:
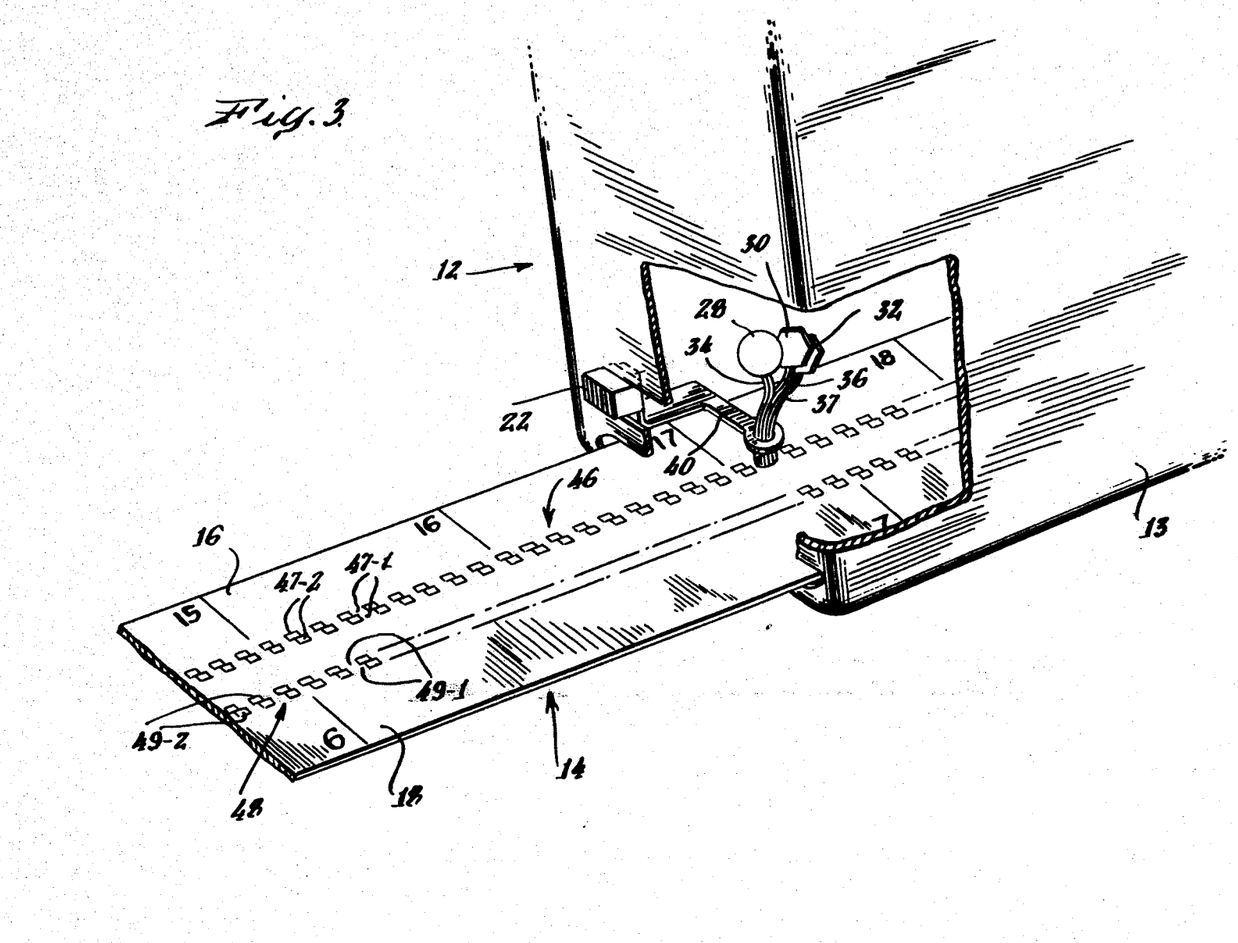
FIG. 3 is an enlarged partial perspective view of the displacement markings along a length of the tape and of the photoelectric transducer and scanner, with a portion of the tape measure housing shown broken away.

As shown in FIG. 3, two sets of code markings 46 and 48 are printed along the length of the flexible tape. The code markings in the set 46 provide a metric count and the markings in set 48 provide a count in English units, i.e. in feet and inches. With the selector switch 22 in the left position as shown the ends of the fiber optic bundles are positioned in scanning relationship with and closely adjacent to the set of metric markings. By moving the switch 22 toward the right to a second position the ends of the flexible fiber optic bundles are moved into scanning relationship with the set of English markings without any necessity for movement of the LED 28 or of the photodetectors 30 and 32. As will be seen from the later description of the logic circuitry, the electronic counter is reset to zero upon movement of the selector switch 22. Thus, the same logic circuitry which provided for the display of the readout in metric units also provides for the display of the readout in English units.

Figure 4:
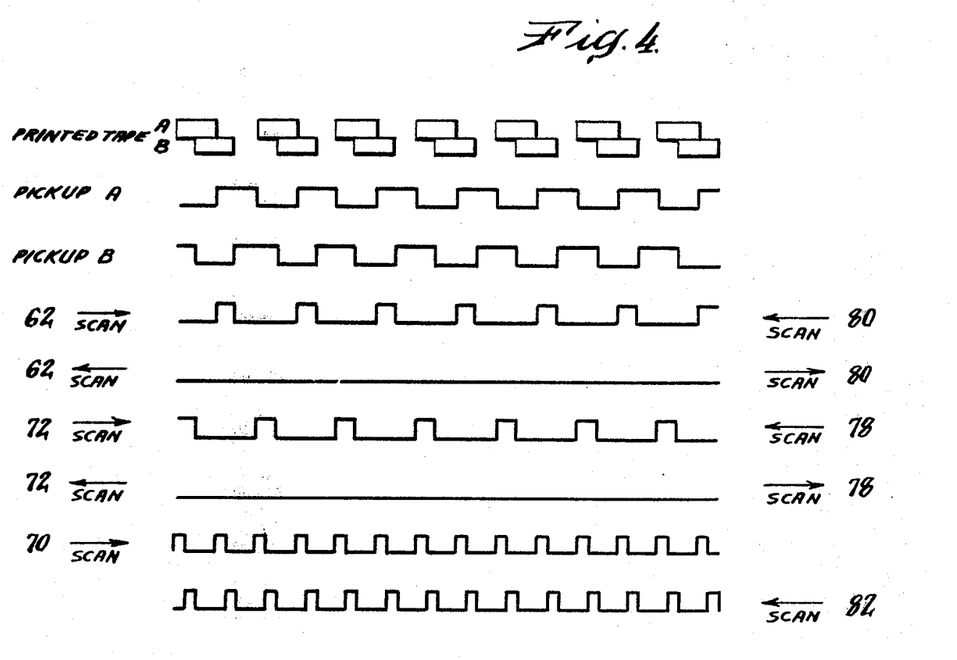
FIG. 4 is a timing chart for illustrating the operation of the tape measure logic circuitry.

Each set 46 and 48 of markings printed on the flexible tape 14 includes two adjacent parallel tracks A and B as shown in FIG. 4. Each track 46A and 46B includes alternating dark and light markings 47-1 and 47-2 respectively, along the length of the track. Similarly, each track 48A and 48B includes dark and light markings 49-1 and 49-2, respectively.

The lengths of the markings are such that, in the metric system for example, the logic circuitry counts once with each millimeter of longitudinal displacement of the tape. Accordingly, for the metric system, each marking 47-1 or 47-2 in either track A or B is one millimeter long.

Similarly, with the English set of markings, the logic circuitry counts once with each 0.01 inch of longitudinal displacement of the tape. And in set 48, each marking 49-1 or 49-2 in either track A or B is 0.01 inch long.

When positioned over a set of markings, each fiber optic scanning bundle 36 and 37 and its respective transducer is associated with a respective track A and B as shown in FIG. 5 and has a high output when the respective fiber optic bundle is positioned over a light marking and a low output when the bundle is positioned over a dark marking. As can be seen in FIG. 4, due to the tracks 46A and 46B and the tracks 48A and 48B being offset with respect to each other, the outputs of the photodetector pickups are phase-shifted by one quarter cycle during scanning with extension or retraction of the tape.

Figure 6A:
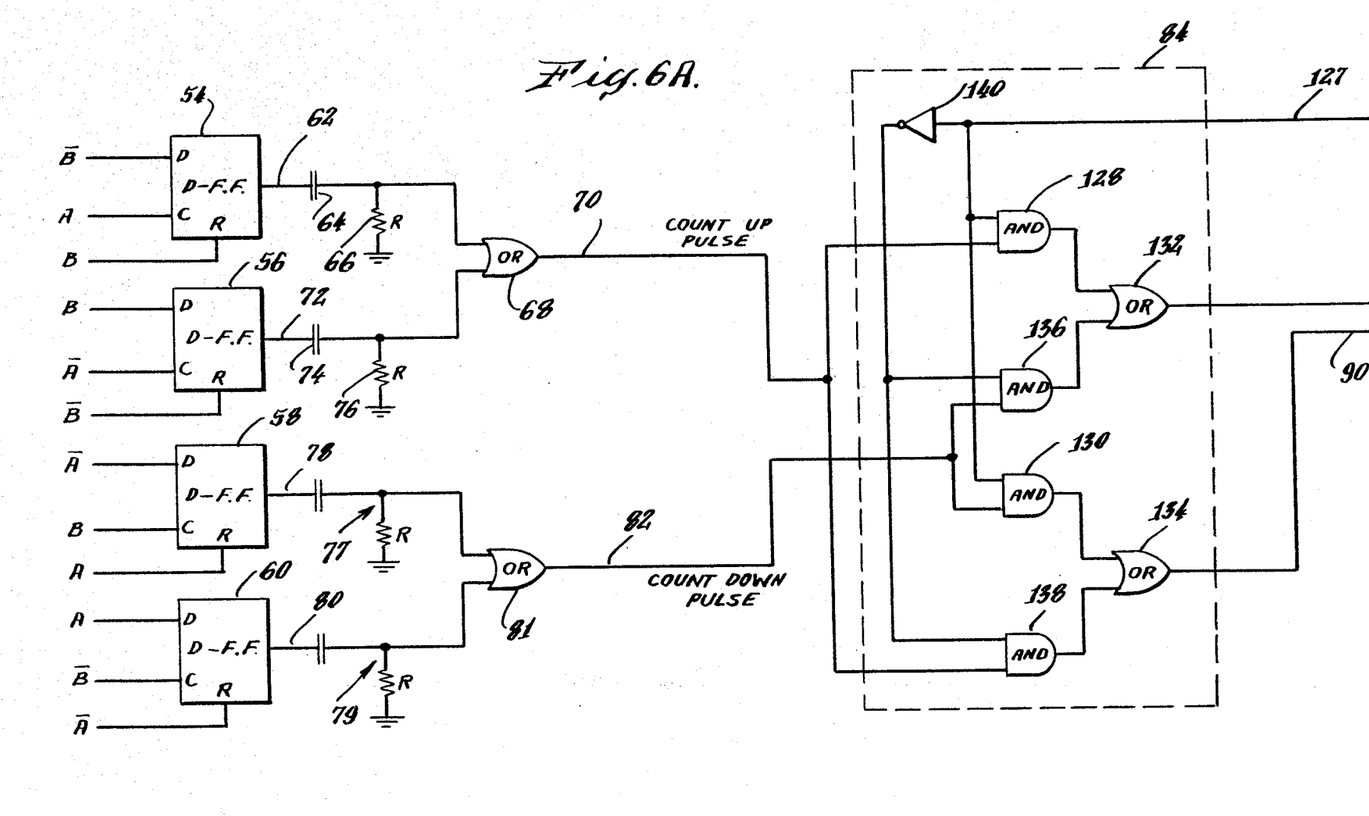
FIGS. 6A and 6B are a schematic diagram of the logic and display circuitry of the digital readout apparatus.
Figure 6B:
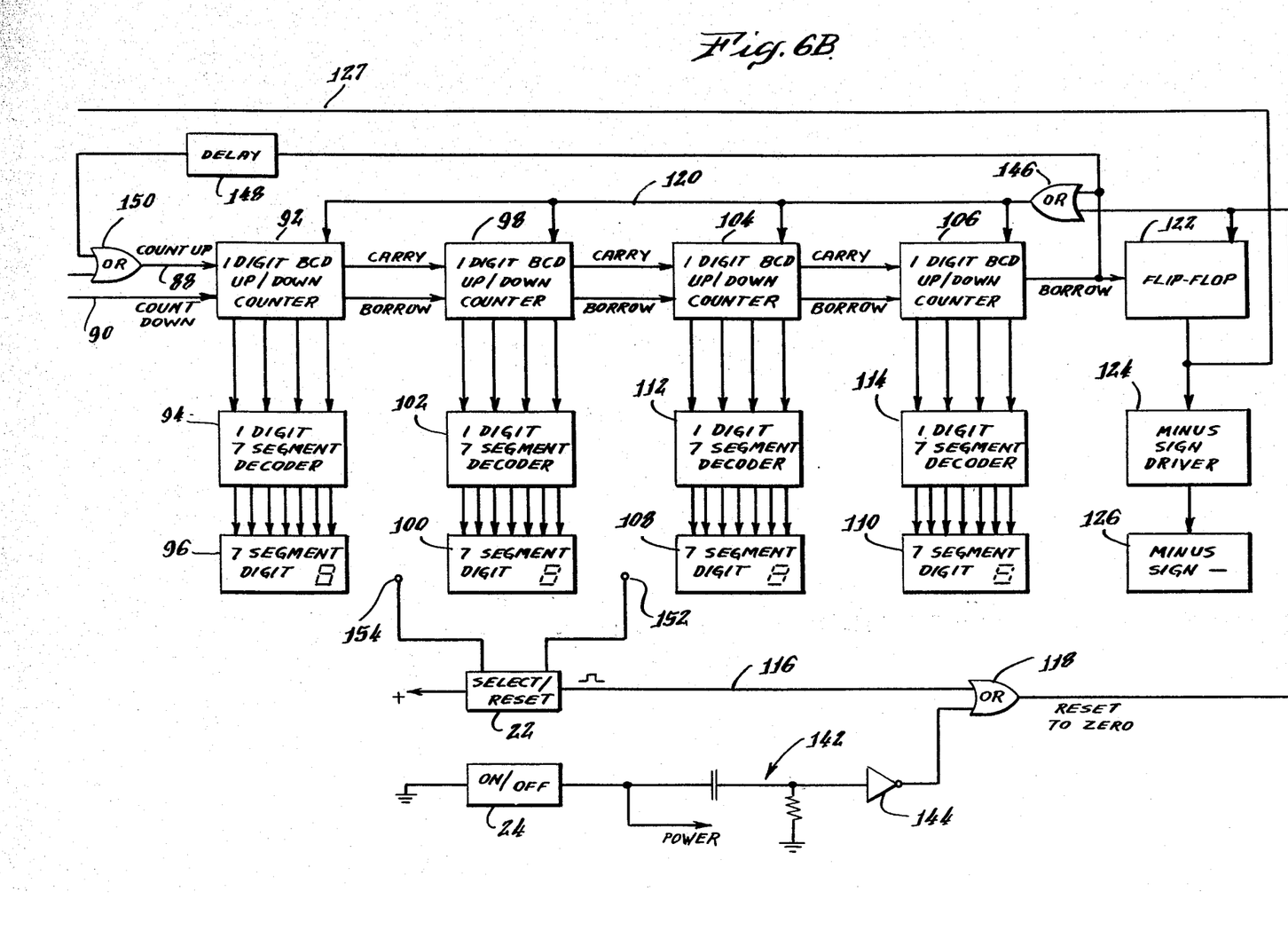

As shown in FIG. 5 the tracks A and B of a set of markings are detected by respective photoelectric transducers or pickups 30 and 32. These outputs are inverted in inverters 50 and 52, and the primary and inverted outputs are applied to the logic circuitry shown in FIG. 6. The outputs of the photoelectric pickup circuitry are applied to four delay or D flip-flops 54, 56, 58 and 60 shown in FIG. 6. Each flip-flop has an upper D input, a clock input, and a reset input and may be an RCA CD4013B flip-flop.

Taking flip-flop 54 as an example, as the tape (with printed tracks A and B thereon) moves from right to left as viewed in FIG. 4 to provide a left to right scan of the tape, the flip-flop delays a high $\overline{B}$ input until the leading edge of a high A clock signal is received. At that time, a high output is provided on line 62 as shown in the third signal line of FIG. 4. As the signal on line 62 goes high the RC edge detector including capacitor 64 and resistor 66 provides a high impulse signal to the OR-gate 68. OR-gate 68 then provides a count-up pulse at its output on line 70. The flip-flop 54 is reset by a high B input one quarter cycle after initiation of the high output on line 62.

With the tape moving left to right in FIG. 4, thereby providing a right to left scan, a high $\overline{B}$ signal is delayed until the leading edge of the next high A input. However, with a right to left scan the A input goes from high to low but not from low to high during the time of the high $\overline{B}$ input; thus flip-flop 54 does not provide a high output on line 62 during right to left scan. This is shown in the fourth signal line in FIG. 4.

Similarly, flip-flop 56 gives a pulsed output on line 72 with a left to right scan but not with a right to left scan. The output on line 72 is fed through a second RC edge detector including capacitor 74 and resistor 76 to a second input to the OR-gate 68. Thus, as can be seen in FIG. 4, an impulse is received on line 70 with each change in state of the output of photoelectric pickup A in a scan from left to right. However, in a scan from right to left no high signals are received on count-up line 70. The pulses on line 70 can then be used to step the up/down counter circuitry to be described.

In a similar manner, B and $\overline{B}$ inputs are respectively used to clock $\overline{A}$ and A inputs to flip-flops 58 and 60 to provide pulses on lines 78 and 80 with right to left scan of the track but no pulses with left to right scan. During right to left scan the pulses on lines 78 and 80 are applied through RC edge detectors 77 and 79 and an OR-gate 81 to provide count-down pulses on line 82.

The count-up and count-down pulses on respective lines 70 and 82 are applied through input logic 84 to the count-up and count-down inputs of a first up/down Binary Coded Decimal (BCD) counter 92. In the usual operation of the circuit, a pulse is received on line 88 with each pulse on line 70 and a pulse is received on line 90 with each pulse on line 82. Thus, when the tape is extended from a zero count, the counter 92 counts up; when the tape is returned to the housing, counter 92 counts back down toward the zero count. The four line BCD output of counter 92 is applied to a one-digit, seven-segment decoder 94 which controls the seven segments of the least significant digit at display portion 96.

With a net count to 10, the counter 92 resets itself to zero and a carry signal is transmitted to a second BCD up/down counter 98. Thus the second counter, related to the second least significant digit, counts up one with each net count to 10 by counter 92. With a zero count in counter 92, a signal on count-down line 90 causes counter 92 to borrow from counter 98. Counter 98 thus counts down one and counter 92 is set to a value of nine. Counter 98 controls a second seven-segment digit at display position 100 through a decoder 102.

In a similar fashion, counter 104 counts up once with each net count to 10 in counter 98, that is with a net count to 100 in the overall counter circuitry. And most-significant digit counter 106 counts up once with each net count to 10 of counter 104. Counters 104 and 106 respectively control the seven-segment digits at display positions 108 and 110 through decoders 112 and 114.

Each up/down counter in the circuit may be an RCA CD40192 counter.

When passed through its center position, the select/reset switch 22 provides a reset signal on line 116 of FIG. 6. The reset signal is applied through gate 118 and along reset line 120 to each of the counters 92, 98, 104 and 106. Thus, the reset signal resets all counters to zero even though the tape may be in an extended position. If the tape is extended further, it counts up from the zero count at the initial extension as before. But if the tape is retracted into the housing from the initial extension, a negative readout is provided. Accordingly, with all four up/down counters at a zero count, a down signal applied on line 90 causes counter 92 to borrow from counter 98. However, with counter 98 at a zero count that counter in turn borrows from counter 104 which in turn borrows from counter 106. Counter 106 then sends a borrow signal to a flip-flop 122. In changing its output state the flip-flop 122 causes a minus-sign driver 124 to display a minus sign at display position 126.

The flip-flop 122 also provides a low signal through line 127 to AND-gates 128 and 130 in the input logic circuitry 84, thus preventing the signals on lines 70 and 82 from passing through the AND-gates 128 and 130 and respective OR-gates 132 and 134 to the up-count and down-count lines 88 and 90. At the same time, AND-gates 136 and 138 are enabled through an inverter 140. As a result, count-up pulses on line 70 are gated through AND-gate 138 and OR-gate 134 to the count-down input 90 of counter 92. And count-down pulses on line 82 are gated through AND-gate 136 and OR-gate 132 to the count-up input 88 of counter 92.

When the borrow signal is sent to the flip-flop 122, the counter circuitry has already counted down once from a zero in each counter to a nine in each counter. Thus, in order to maintain an accurate count in the minus range, means is provided for resetting the counter circuitry with counter 92 at a count of one and the remaining counters at a count of zero. Accordingly, the borrow signal is gated through a reset OR-gate 146 to reset each counter to zero. The borrow signal is also delayed in a delay circuit 148 and applied to the count-up input of counter 92 through an OR-gate 150. The delay is sufficient to permit resetting of all counters before the count signal is applied.

It can be seen that, with the counter circuitry set at zero, a count-down pulse causes a minus sign to be displayed and the counter inputs to be shifted for an increasingly negative display with subsequent count-down pulses.

Because the counters are automatically reset to zero when the select switch is shifted from one standard to another, it is possible for the same logic circuitry to be used for counting units in both standards. The output for each standard is a function of the lengths of markings in the respective set of markings.

Another reset signal is initiated by the on/off switch 24. When the tape measure device is switched on, a low impulse is produced by the RC edge detector 142 in FIG. 6. That impulse is inverted by inverter 144 and applied through OR-gate 118 to reset line 120. Thus the digital display always gives an initial zero readout when the tape measure device is turned on.

In one embodiment, the display includes a stationary decimal point after the second digit. Thus, the output reads in inches and hundredths of inches when the select switch 22 is positioned for English readout and in decimeters and hundredths of decimeters when the switch 22 is positioned for metric readout. In an alternative embodiment, as shown in FIG. 6, additional circuitry is provided from the switch 22 to display appropriate decimal points with each standard display, allowing a display in centimeters and tenths of centimeters for example. As shown in FIG. 6, when the select switch 122 is set for English readout a decimal point 152 is energized for displaying inches and hundredths of inches. And when the select switch 122 is set for metric readout a decimal point 154 is energized for displaying centimeters and tenths of centimeters.

Modification to the circuitry might include a count-by-two mode for English measurements thus permitting the use of markings of 0.02 inch rather than 0.01 inch lengths. Also, a count-to-twelve counter could be used with English measurements to provide a display in feet and inches. As another variation, circuit means could be provided for adding the length of the housing to the displayed output for inside measurements.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A tape measure device for providing a digital readout corresponding to the actual cumulative extension of a tape, said tape measure device comprising:
   a housing,
   a flexible tape having an end thereof with two measuring scales extending along the length of said tape from said end in English units and metric units, respectively, with respective legible numbers printed on the tape along the respective scales for indicating the length along said tape from said end in English and metric units,
   means for winding said tape into a coil in said housing when the tape is retracted into the housing,
   two sets of optically sensed encoded markings extending along the tape, each set of markings corresponding to a respective one of said scales,
   a light source in said housing for illuminating said sets of encoded markings on said tape as it is being extended from or retracted into said housing,
   light detector means in said housing and adjacent said tape for detecting an illuminated set of markings as they pass the light detector means during extension or retraction of said tape,
   manually operable control means for selectively shifting said light detector means for detecting one or the other of said set of markings,
   electronic logic means responsive to the detected markings for providing an electronic count proportion to actual, net longitudinal extension of said tape from said housing, and
   a digital display for providing a display in response to said electronic count corresponding to the actual net extension of said tape from said housing,
   thereby providing a display of actual net extension of said tape from said housing in English or metric units.

2. A tape measure device as claimed in claim 1 wherein said optically encoded markings are alternating light and dark markings.

3. A tape measure device as claimed in claim 2 wherein said alternating markings are arranged in two tracks of alternating markings offset relative to each other.

4. A tape measure device for providing a digital readout corresponding to the actual cumulative extension of a tape, said tape measure device comprising:
   a housing,
   a flexible tape having an end thereof with two measuring scales extending along the length of said tape from said end in English units and metric units, respectively, with respective numbers printed on the tape along the respective scales for indicating the length along said tape from said end in English and metric units,
   means for winding said tape into a coil in said housing when the tape is retracted into the housing, two sets of optically sensed encoded markings extending along the tape, each set of markings corresponding to a respective one of said scales, a light source in said housing for illuminating said encoded markings on said tape as it is being extended from or retracted into said housing, light detector means in said housing and adjacent said tape for detecting an illuminated set of markings as they pass the light detector means during extension or retraction of said tape, manually operable control means for selectively shifting said lift detector means for detecting one or the other of said set of markings, electronic logic means responsive to the detected markings for providing an electronic count proportion to actual net longitudinal extension of said tape from said housing, a digital display for providing a display in response to said electronic count corresponding to the actual net extension of said tape from said housing, said set markings corresponding to the English scale include markings each having a longitudinal length along said tape proportional to a predetermined decimal portion of an inch, said set of markings corresponding to the metric scale include markings each having a longitudinal length along said tape proportional to a predetermined decimal portion of a centimeter, thereby providing a display of actual net extension of said tape from said housing in English or metric units, and thereby enabling the same electronic logic means to display the readout decimally in English units or in metric units as said manually operable control means is selectively actuated for detecting one or the other of said set of markings.

5. A tape measure device for providing a digital readout corresponding to the actual cumulative extension of a tape, said tape measure device comprising:

a housing, a flexible tape having an end thereof with two measuring scales extending along the length of said tape from said end in English units and metric units, respectively, with respective numbers printed on the tape along the respective scales for indicating the length along said tape from said end in English and metric units, means for winding said tape into a coil in said housing when the tape is retracted into the housing, two sets of optically sensed encoded markings extending along the tape, each set of markings corresponding to a respective one of said scales, light source means in said housing for illuminating said encoded markings on said tape as it is being extended from or retracted into said housing, light detector means in said housing and adjacent said tape for detecting said illuminated markings as they pass the light detector means during extension or retraction of said tape, manually operable control means for selecting whether the readout is to be in English or metric units, electronic logic means responsive to the detected markings for providing an electronic count proportion to actual net longitudinal extension of said tape from said housing, and a digital display for providing a display in response to said electronic count corresponding to the actual net extension of said tape from said housing, thereby providing a display of actual net extension of said tape from said housing in English or metric units.

6. A tape measure device for providing a digital readout corresponding to the actual cumulative extension of a tape, said tape measure device comprising:

a housing, a flexible tape having an end thereof with two measuring scales extending along the length of said tape from said end in English units and metric units, respectively, with respective numbers printed on the tape along the respective scales for indicating the length along said tape from said end in English and metric units, means for winding said tape into a coil in said housing when the tape is retracted into the housing, two sets of optically sensed encoded markings extending along the tape, each set of markings corresponding to a respective one of said scales, light source means in said housing for illuminating said encoded markings on said tape as it is being extended from or retracted into said housing, light detector means in said housing and adjacent said tape for detecting said illuminated markings as they pass the light detector means during extension or retraction of said tape, electronic logic means responsive to the detected markings for providing an electronic count proportion to actual net longitudinal extension of said tape from said housing, a digital display for providing a display in response to said electronic count corresponding to the actual net extension of said tape from said housing, manually operable control means for electing whether the readout is to be in English or metric units, said set markings corresponding to the English scale include markings each having a longitudinal length along said tape proportional to a predetermined decimal portion of an inch, and said set of markings corresponding to the metric scale including markings each having a longitudinal length along said tape proportional to a predetermined decimal portion of a centimeter, thereby enabling the same electronic logic means to display the readout decimally in English units or in metric units in response to said manually operable control means.

7. A tape measure device for providing a digital readout corresponding to the extension of a tape, said tape measure device comprising:

a housing, a flexible tape, said tape having optically sensed encoded markings along its length, means for winding said tape into a coil in said housing, a light source in said housing for illuminating said markings on said tape as it is wound or unwound from said coil, light detector means in said housing and adjacent said tape for detecting said illuminated markings as they pass the light detector means during winding and unwinding, electronic logic means responsive to the detected markings for providing an electronic count proportional to longitudinal displacement of said tape past said light detector means, a digital display for providing a display corresponding to the displacement of said tape in response to said electronic count, said light detector means including two light detectors and at least two fiber optic bundles serving as light guides for directing light from said flexible tape to the respective detectors and further including fiber optic bundles for transmitting the light from said light source to said tape, said flexible tape having at least two separate sets of such markings, and said tape measure device further comprising means for selectively positioning said fiber optic bundles over one or the other of said sets of markings.

8. A tape measure device as claimed in claim 7, in which:

said flexible tape includes two different measuring scales extending along the length thereof, said two sets of encoded markings also extend along the same side of said tape as said two measuring scales, and one set of said encoded markings corresponds with one of said measuring scales and the other set corresponds with the other measuring scale.

9. A tape measure device as claimed in claim 7 wherein said logic means comprises means for resetting said electronic count when said fiber optic bundles are moved from said one set of markings to the other.

10. A tape measure device for providing a digital readout corresponding to the actual cumulative extension of a tape from its housing, said tape measure device comprising:

a housing, a flexible tape, said tape having at least two measuring scales in different units of measure extending along the length thereof and also having at least two sets of encoded markings along its length, one set corresponding to one unit of measure and the other set corresponding to another unit of measure, means for winding said tape into a coil in said housing, detector means in said housing and adjacent said tape for selectively detecting one or the other of said two sets of markings as the markings pass the light detector means during extension of said tape from said housing and during retraction of said tape into said housing, electronic logic means responsive to the detection of a selected set of said encoded markings for providing an electronic count in measurement units proportional to actual cumulative longitudinal extension of said tape with the selected set of said encoded markings moving past said detector means, and a digital display for providing a measurement display corresponding to the actual cumulative extension of said tape in response to said electronic count.

* * * * *